(12) United States Patent
Kobayashi et al.

(10) Patent No.: US 11,685,512 B2
(45) Date of Patent: Jun. 27, 2023

(54) LIFT-CHANGING MECHANISM

(71) Applicant: SUBARU CORPORATION, Tokyo (JP)

(72) Inventors: Wataru Kobayashi, Tokyo (JP); Hirotaka Hayashi, Tokyo (JP); Mizuki Nakamura, Tokyo (JP); Masafumi Sasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/307,421

(22) Filed: May 4, 2021

(65) Prior Publication Data
US 2021/0371082 A1    Dec. 2, 2021

(30) Foreign Application Priority Data
Jun. 1, 2020    (JP) ................................ 2020-095180

(51) Int. Cl.
*B64C 9/18*    (2006.01)
*B64C 3/50*    (2006.01)
*B64C 9/34*    (2006.01)

(52) U.S. Cl.
CPC .................. *B64C 9/18* (2013.01); *B64C 3/50* (2013.01); *B64C 9/34* (2013.01)

(58) Field of Classification Search
CPC .... B64C 9/18; B64C 3/50; B64C 9/34; B64C 21/02; B64C 2009/143; B64C 9/146
See application file for complete search history.

(56) References Cited

U.S. PATENT DOCUMENTS

| | | | | |
|---|---|---|---|---|
| 2,019,018 | A  * | 10/1935 | Methvin ................. | B64C 21/02 244/204 |
| 3,232,563 | A  * | 2/1966 | Langfelder ............. | B64C 9/323 244/213 |
| 3,576,301 | A  * | 4/1971 | Stickle .................... | B64C 21/02 244/216 |
| 10,259,566 | B1 * | 4/2019 | Lawrence ................. | B64C 9/24 |
| 2019/0283863 | A1 * | 9/2019 | Bowers ..................... | B64C 9/14 |
| 2020/0130816 | A1 * | 4/2020 | O'Rourke ............. | B64C 23/076 |

FOREIGN PATENT DOCUMENTS

| | | |
|---|---|---|
| EP | 3 647 185 A1 | 5/2020 |
| GB | 440659 A | 1/1936 |
| GB | 2 129 748 A | 5/1984 |
| JP | 2019-177864 A | 10/2019 |

OTHER PUBLICATIONS

Extended European Search Report dated Oct. 15, 2021 for European Patent Application No. 21174033.7-1010.

* cited by examiner

*Primary Examiner* — Joshua J Michener
*Assistant Examiner* — Cindi M Curry
(74) *Attorney, Agent, or Firm* — McGinn I.P. Law Group, PLLC.

(57) ABSTRACT

A lift-changing mechanism is configured to change generated by a wing of an aircraft and includes a slit and an opening and closing member. The slit extends in a wingspan direction inside the wing and forms openings on the lower surface of the wing and on the upper surface of the wing respectively. A part of airflow below the lower surface is allowed to flow toward the upper surface through the slit. The opening and closing member is configured to open and close the slit. When the opening and closing member opens the slit, lift generated on the wing is decreased compared with when the slit is closed.

10 Claims, 6 Drawing Sheets

LIFT-CHANGING MECHANISM

CROSS-REFERENCE TO RELATED APPLICATIONS

The present application claims priority from Japanese Patent Application No. 2020-095180 filed on Jun. 1, 2020, the entire contents of which are hereby incorporated by reference.

BACKGROUND

The disclosure relates to a lift-changing mechanism capable of changing lift generated by a wing of an aircraft.

Typically, lift on an aircraft is changed by its wings.

That is, for an airplane, for instance, a main wing has a flap (high-lift device) including a movable wing portion, and lift can be changed by vertically moving or extending the movable wing portion (see, for example, Japanese Unexamined Patent Application Publication 2019-177864).

For a rotorcraft, such as a helicopter, in many cases, lift can be changed by, for example, changing the angle of attack (pitch angle) of each blade of a main rotor.

SUMMARY

An aspect of the disclosure provides a lift-changing mechanism configured to change lift generated by a wing of an aircraft. The lift-changing mechanism includes a slit and an opening and closing member. The slit extends in a wingspan direction inside the wing and forms openings on the lower surface of the wing and on the upper surface of the wing respectively. A part of airflow below the lower surface is allowed to flow toward the upper surface through the slit. The opening and closing member is configured to open and close the slit. When the opening and closing member opens the slit, lift generated by the wing is decreased compared with when the slit is closed.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

If the angle of attack is changed by moving a movable wing portion or rotating (swinging) a main rotor blade, a relatively large component (i.e., a movable wing portion or rotor blade) is moved in strong airflow. Thus, a large load may be placed on a driving device or other equipment for use in moving the component, which may cause issues in terms of, for instance, the durability and reliability of the driving device or other equipment.

After continuous investigation, the inventors of the disclosure developed a new lift-changing mechanism capable of changing lift generated by a wing of an aircraft (such as a main wing of an airplane or the main rotor of a rotorcraft). By using a miniaturized component as a component to be moved to change lift, the new lift-changing mechanism can change lift without moving a large component.

It is desirable to provide a lift-changing mechanism capable of changing lift generated by a wing of an aircraft without moving a large component, such as a movable wing portion of an airplane or a rotor blade of a rotorcraft.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

It should be noted that a wing described hereinafter is described as a main wing of an airplane. However, the same account applies to, for example, a rotor blade of a rotorcraft. Hereinafter, above the upper surface of the wing means above the wing, below the lower surface of the wing means below the wing, the leading edge of the wing corresponds to the front of the wing, and the trailing edge of the wing corresponds to the rear of the wing.

The lift-changing mechanism according to the disclosure has a slit in a wing of an aircraft and an opening and closing member designed to open and close the slit. When the opening and closing member opens the slit, lift on the wing is decreased compared with when the slit is closed. Thus, the lift generated by the wing can be changed by causing the opening and closing member to open and close the slit.

Hereinafter, embodiments are provided to describe the details.

Embodiment 1

Figure 1:
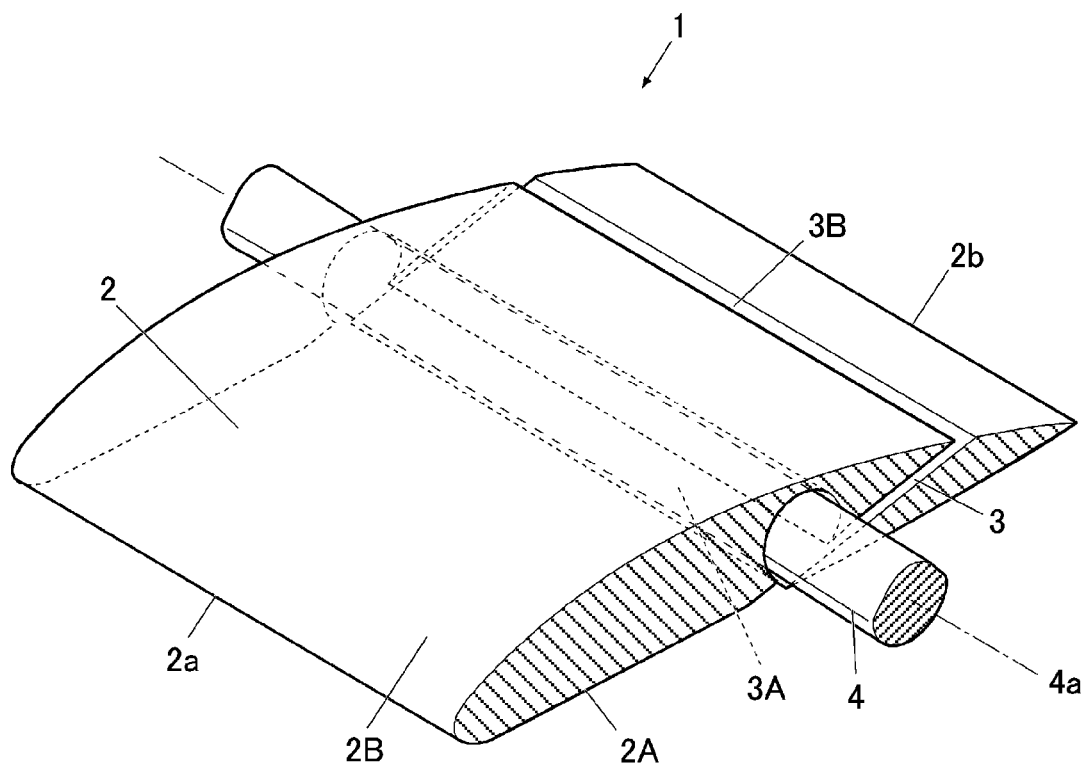
FIG. 1 illustrates a structure of a lift-changing mechanism according to Embodiment 1.

FIG. 1 illustrates a structure of a lift-changing mechanism according to Embodiment 1 of the disclosure. A lift-changing mechanism 1 has a slit 3 in a wing 2 of an aircraft and an opening and closing member 4 designed to open and close the slit 3.

The wing 2 is, for example, a main wing of an airplane or a rotor blade of a rotorcraft. When the airplane flies or the rotor of the rotorcraft rotates, lift is generated on the wing.

The wing 2 has the slit 3 near a trailing edge 2b.

The slit 3 extends in a wingspan direction inside the wing 2 and forms an opening 3A on a lower surface 2A of the wing 2 and an opening 3B on an upper surface 2B of the wing 2. A portion of airflow below the lower surface 2A of the wing 2 flows toward the upper surface 2B of the wing 2 through the slit 3.

In Embodiment 1, regarding the slit 3, the opening 3A on the lower surface 2A of the wing 2 is closer than the opening 3B on the upper surface 2B of the wing 2 to a leading edge 2a of the wing 2. The slit 3 with respect to the lower surface 2A of the wing 2 is inclined upward toward the trailing edge 2b of the wing 2.

Thus, when the slit 3 is open, a portion of the airflow below the lower surface 2A of the wing 2 smoothly flows toward the upper surface 2B of the wing 2 through the slit 3 (see FIG. 5B described later).

The opening and closing member 4 is designed to open and close the slit 3.

In Embodiment 1, the opening and closing member 4 is bar-shaped, passes through the wing 2 so as to extend in the wingspan direction, and is disposed parallel to the slit 3. The opening and closing member 4 is rotatable around an axis 4a in one or both rotational directions, the axis 4a extending in a longitudinal direction of the opening and closing member 4. The radius from the axis 4a to the side of the opening and closing member 4 is not constant. For instance, as the cross-sectional configuration illustrated in FIG. 2, the side of the opening and closing member 4 is made up of a cylinder surface 4A having a large radius (radius R), a cylinder surface 4B having a small radius (radius r), and two substantially flat surfaces 4C present between the cylinder surface 4A and the cylinder surface 4B.

The opening and closing member 4 is rotated while maintaining or changing the rotational direction. As illustrated in FIG. 3A, when a portion of the opening and closing member 4 having a large radius (cylinder surface 4A having a large radius, in the example in FIG. 2) travels to the slit 3, the side (cylinder surface 4A) of the opening and closing member 4 comes into contact with an inner wall surface of the slit 3 (the inner wall surface includes an end portion of the inner wall surface, that is, the edge of the opening 3A of the slit 3, and the same applies to the inner wall surface of the slit 3 described hereinafter). Thus, in this case, the opening and closing member 4 closes the slit 3.

The opening and closing member 4 is rotated while maintaining or changing the rotational direction. As illustrated in FIG. 3B, when a portion of the opening and closing member 4 having a small radius (cylinder surface 4B having a small radius and substantially flat surface 4C, in the example in FIG. 2) travels to the slit 3, a gap appears between the inner wall surface of the slit 3 and the side of the opening and closing member 4 (cylinder surface 4B and substantially flat surface 4C). Thus, in this case, the opening and closing member 4 opens the slit 3.

Figure 2:
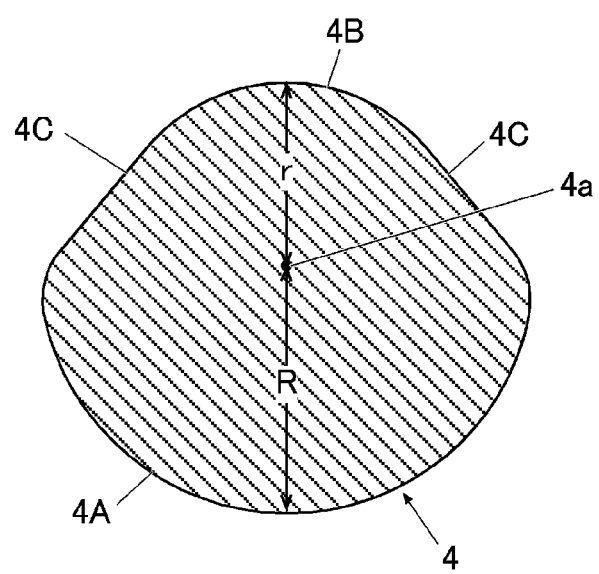
FIG. 2 illustrates an example of the cross-sectional configuration of an opening and closing member according to Embodiment 1.
Figure 3A:
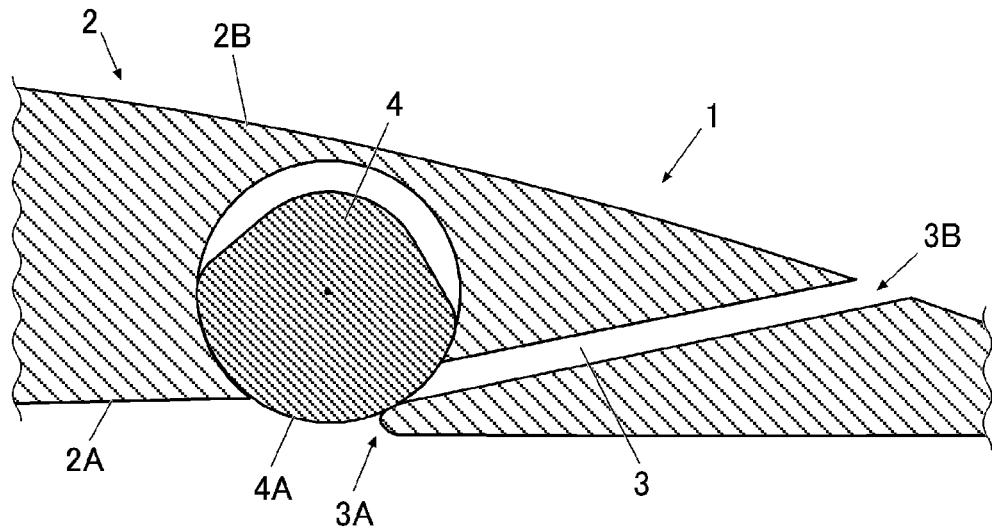
FIG. 3A is a cross-sectional view illustrating a state in which a slit is closed by the opening and closing member according to Embodiment 1.
Figure 3B:
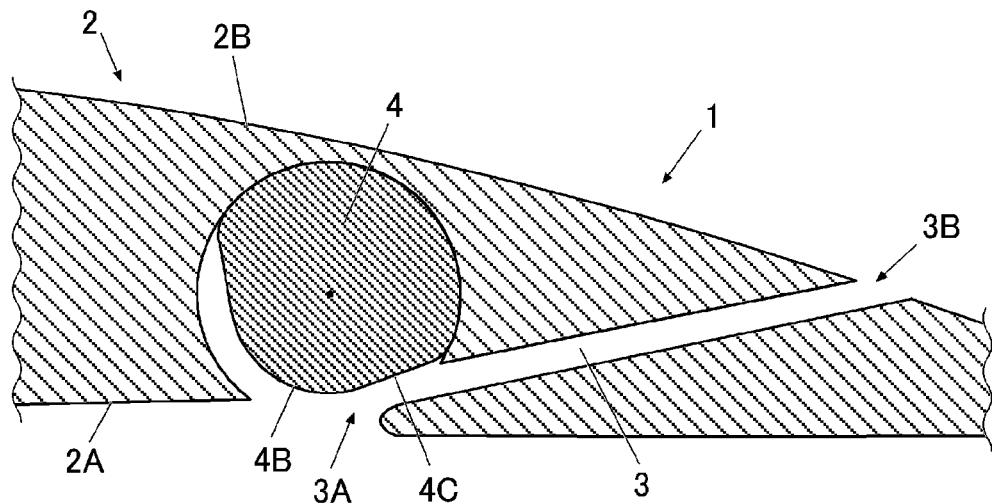
FIG. 3B is a cross-sectional view illustrating a state in which the slit is opened by the opening and closing member according to Embodiment 1.

In Embodiment 1, the opening and closing member 4 opens the slit 3 by using the portion having a small radius (cylinder surface 4B having a small radius and substantially flat surface 4C, in the example in FIG. 2). In addition, the opening and closing member 4 closes the slit 3 by using the portion having a large radius (cylinder surface 4A having a large radius, in the example in FIG. 2).

Figure 4A:
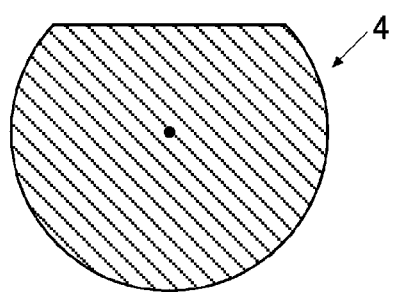
FIGS. 4A and 4B each illustrate another example of the cross-sectional configuration of the opening and closing member according to Embodiment 1.

It should be noted that the opening and closing member 4 need not necessarily have a shape as illustrated in FIG. 2. The opening and closing member 4 may be, for instance, elliptic or eccentric in cross section. As illustrated in FIG. 4A, the cross-sectional configuration of the opening and closing member 4 may be a circle partially cut by a straight line.

Figure 4B:
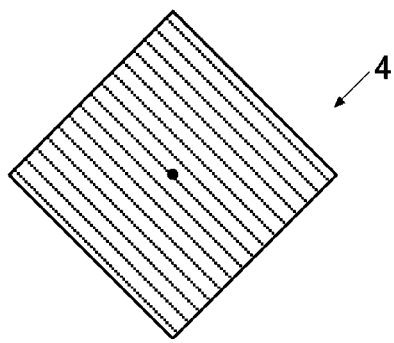

In addition, as illustrated in FIG. 4B, the opening and closing member 4 may be polygonal in cross section. Any cross-sectional configuration is applicable as long as advantageous effects described below can be effectively obtained.

When the opening and closing member 4 opens the slit 3, if the side of the opening and closing member 4 is too far from the inner wall surface of the slit 3, the rate of airflow through the slit 3 may increase excessively, which may cause turbulence, for example.

To avoid such an issue, it is desirable that the opening and closing member 4 have a shape that can provide an appropriate distance between the side of the opening and closing member 4 and the inner wall surface of the slit 3 when the slit 3 is open.

As described above, the opening and closing member 4 may be rotatable around the axis 4a in both rotational directions.

In this case, when for instance the opening and closing member 4 in the state illustrated in FIG. 3A, that is, the opening and closing member 4 closing the slit 3, is rotated clockwise in FIG. 3A, the slit 3 is opened as illustrated in FIG. 3B. When closing the slit 3, the opening and closing member 4 in the state illustrated in FIG. 3B is rotated in the opposite direction (that is, anticlockwise).

As described above, the opening and closing member 4 may be rotatable around the axis 4a in one rotational direction.

In this case, when for instance the opening and closing member 4 in the state illustrated in FIG. 3A, that is, the opening and closing member 4 closing the slit 3 is rotated anticlockwise (or clockwise), the slit 3 is opened as illustrated in FIG. 3B. When closing the slit 3, the opening and closing member 4 in the state illustrated in FIG. 3B is rotated anticlockwise (or clockwise).

In addition, if the opening and closing member 4 continuously rotates around the axis 4a in one rotational direction (that is, continues to rotate in one rotational direction without stopping), the opening and closing member 4 periodically opens and closes the slit 3.

By rotating the opening and closing member 4 in one rotational direction at a high speed, the slit 3 is opened and closed in a short cycle (at a high frequency).

It should be noted that the material of the opening and closing member 4 is not limited to a particular material. A material, such as a metal, a resin, an elastomer, or a combination of such materials, can be appropriately used as long as the material can come into contact with the inner wall surface of the slit 3 and effectively close the slit 3.

Although not illustrated in the figures, a driving device, such as a motor, may be disposed inside the wing 2 or the fuselage of an airplane. The driving device is used to rotate the opening and closing member 4 around the axis 4a while maintaining or changing the rotational direction.

Next, the advantageous effects of the lift-changing mechanism 1 according to Embodiment 1 are described.

Figure 5A:
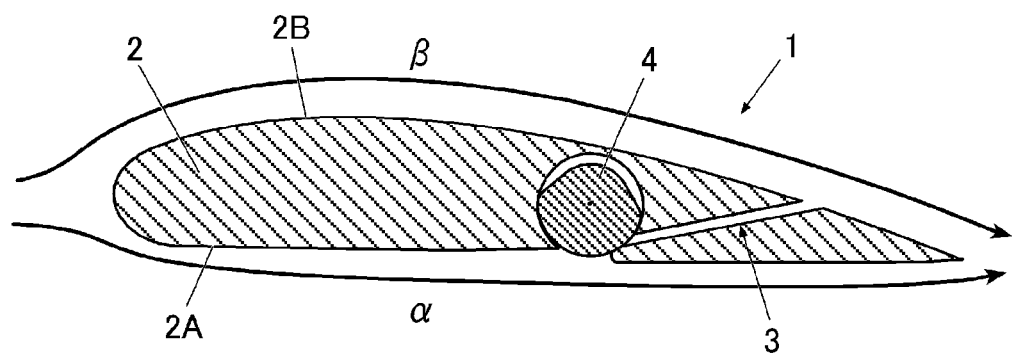
FIG. 5A illustrates airflow when the slit is closed by the opening and closing member.
Figure 5B:
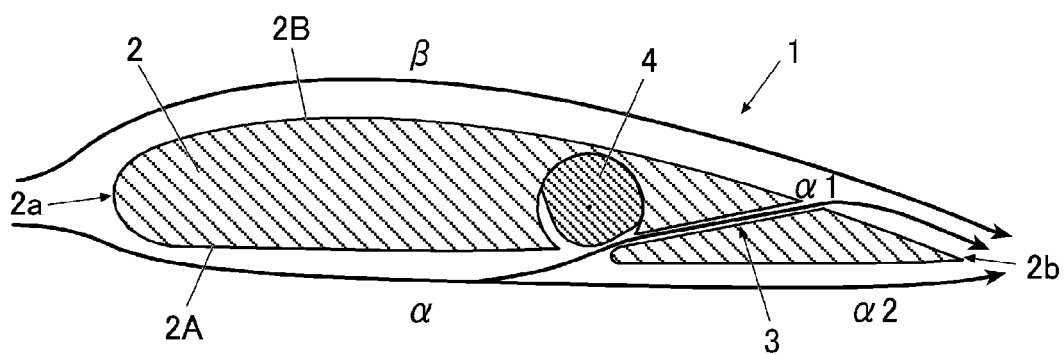
FIG. 5B illustrates airflow when the slit is opened by the opening and closing member.

When an airplane flies (or the rotor of a rotorcraft rotates) in the state in which the slit 3 of the wing 2 is closed by the opening and closing member 4, as illustrated in FIG. 5A, airflow α follows the lower surface 2A of the wing 2, and airflow β follows the upper surface 2B of the wing 2. Thus, predetermined lift is generated on the wing 2.

In this case, the airflow does not flow through the slit 3, and the airflow α and the airflow β follow only the lower surface 2A and the upper surface 2B of the wing 2. Thus, the state illustrated in FIG. 5A is identical to a state in which lift is generated on the wing 2 without the slit 3.

Meanwhile, the slit 3 of the wing 2 is opened by rotating the opening and closing member 4 in the state illustrated in FIG. 5A. Then, as illustrated in FIG. 5B, an airflow α1 (a portion of the airflow α) diverted from the airflow α following the lower surface 2A of the wing 2 flows through the slit 3 and exits through the opening 3B on the upper surface 2B of the wing 2.

Thus, also in this case, lift is generated on the wing 2. The airflow α1 (a portion of the airflow α), which has been diverted from the airflow α following the lower surface 2A of the wing 2 and is flowing through the slit 3, however, acts and generates lift on a portion of the wing 2 in front of the slit 3 (a remaining portion obtained by hypothetically removing, from the wing 2, a portion including the trailing edge 2b of the wing 2).

That is, the airflow α1, which has been diverted from the airflow α following the lower surface 2A of the wing 2 and is flowing through the slit 3, generates lift on a hypothetical wing that is smaller than the whole of the wing 2 and that closely resembles a wing having a symmetrical cross section (wing having a symmetrical airfoil).

Thus, the generated lift is less than lift generated by the airflow α that continues to follow the lower surface 2A of the wing 2 (that is, the airflow α that does not flow through the slit 3) (see airflow α in FIG. 5A).

In the lift-changing mechanism 1 according to Embodiment 1, when the opening and closing member 4 closes the slit 3 (see FIG. 5A), the airflow α following the lower surface 2A of the wing 2 continues to follow the lower surface 2A of the wing 2 to the trailing edge 2b of the wing 2 without flowing through the slit 3.

Thus, the airflow α following the lower surface 2A of the wing 2 generates the predetermined lift on the wing 2.

Meanwhile, when the opening and closing member 4 opens the slit 3 (see FIG. 5B), a portion of the airflow α following the lower surface 2A of the wing 2 flows through the slit 3, and the rest of the airflow, that is, an airflow α2, continues to follow the lower surface 2A of the wing 2 to the trailing edge 2b of the wing 2 without flowing through the slit 3.

Lift generated by the airflow α1, which has been diverted from the airflow α following the lower surface 2A of the wing 2 and is flowing through the slit 3, is less than lift generated by the airflow α2, which continues to follow the lower surface 2A of the wing 2 without flowing through the slit 3.

Thus, when the slit 3 is open, the lift generated by the airflow α1 flowing through the slit 3 is less than the lift generated by the airflow α2, which does not flow through the slit 3. This means that lift generated on the wing 2 when the slit 3 is open is less than lift generated on the wing 2 when the slit 3 is closed (when none of the airflow α flows through the slit 3).

In the lift-changing mechanism 1 according to Embodiment 1, when the opening and closing member 4 opens the slit 3, lift generated on the wing 2 is decreased compared with when the slit 3 is closed. Thus, the lift generated on the wing 2 can be changed by opening and closing the slit 3.

In Embodiment 1, the lift generated on the wing 2 is changed so that the lift generated on the wing 2 when the slit 3 is open is less than the predetermined lift (lift generated when the slit 3 is closed). The same applies to other embodiments described below.

In addition, the direction of a portion of the airflow α below the wing 2 is changed by opening and closing the slit 3, which can change the lift generated on the wing 2.

Thus, in the lift-changing mechanism 1 according to Embodiment 1, lift generated on the wing 2 can be changed by causing the opening and closing member 4 to open and close the slit 3, through which a portion of the airflow α below the lower surface 2A of the wing 2 flows toward the upper surface 2B of the wing 2.

To cause the opening and closing member 4 to open and close the slit 3, as described in Embodiment 1, for instance, the bar-shaped opening and closing member 4 is rotated around the axis 4a inside the wing 2 while maintaining or changing the rotational direction.

Unlike the conventional technology, to change lift on the wing 2, the lift-changing mechanism 1 according to Embodiment 1 does not have to move the movable wing portion (flap) of a main wing of an airplane or rotate (swing) a main rotor blade of a helicopter. That is, the lift-changing mechanism 1 according to Embodiment 1 does not have to move a relatively large component in strong airflow and instead just rotates the bar-shaped opening and closing member 4 inside the wing 2 while maintaining or changing the rotational direction.

Hence, in Embodiment 1, lift generated on the wing of the aircraft can be changed without moving a large component, such as a movable wing portion of an airplane or a rotor blade of a rotorcraft.

Conventionally, large components are moved in strong airflow. This may place a large load on, for example, an actuator or a driving source for use in moving the components, which may cause a malfunction in such a device. In Embodiment 1, on the other hand, the bar-shaped opening and closing member 4 is just rotated inside the wing 2 while maintaining or changing the rotational direction. Thus, a malfunction is less likely to be caused.

Hence, the lift-changing mechanism 1 according to Embodiment 1 has high durability and reliability.

Figure 6A:
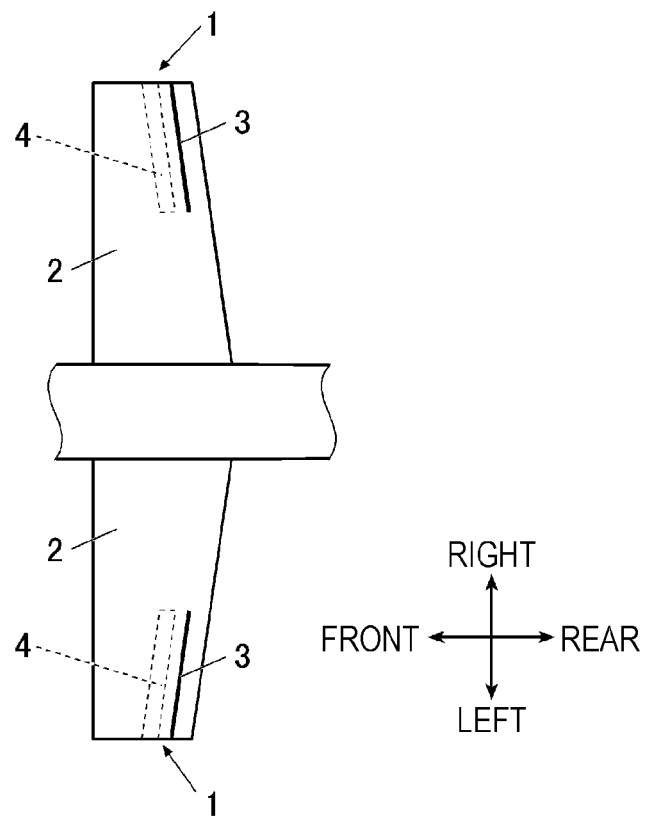
FIG. 6A is a plan view and illustrates a state in which the lift-changing mechanism is provided near the wing tip of each wing.
Figure 6B:
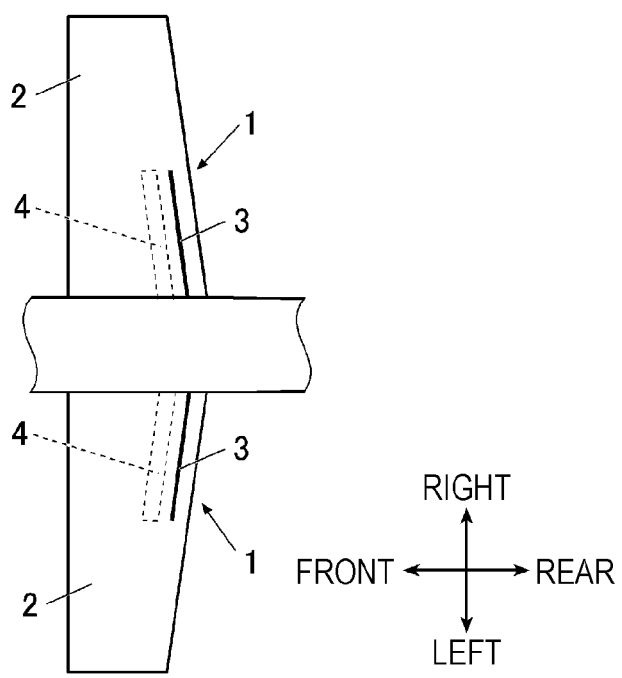
FIG. 6B is a plan view and illustrates a state in which the lift-changing mechanism is provided near the wing root of each wing.

It should be noted that the slit 3 and the opening and closing member 4 (lift-changing mechanism 1) may extend over the full length of the wing 2 in the wingspan direction or may be provided only near a wing tip (see FIG. 6A) or a wing root (see FIG. 6B). The same applies to the other embodiments described below.

The position of the lift-changing mechanism 1 to be provided in the wing 2 can be appropriately determined.

As an example, consider a case in which the lift-changing mechanisms 1 are formed, one in each of the left and right main wings of an airplane. In this case, in the left and right lift-changing mechanisms 1, when the opening and closing members 4 simultaneously open or close the slits 3, total lift on the left and right main wings can be decreased or increased (the lift-changing mechanisms 1 serve as flaps).

During landing, lift can be decreased by simultaneously opening the slits 3 in the left and right wings 2 (the lift-changing mechanisms 1 serve as spoilers).

In addition, for the airplane to roll, one of the opening and closing members 4 of the left and right lift-changing mechanisms 1 will be caused to open the slit 3, and the other will be caused to close the slit 3 (or the opening and closing members 4 of the left and right lift-changing mechanisms 1 will be caused to move in opposite phase to open and close the slits 3) (the lift-changing mechanisms 1 serve as ailerons).

It should be noted that in addition to the lift-changing mechanism 1, the airplane may be provided with a flap (movable wing portion), spoiler, aileron, and/or other components.

The embodiments described below differ from Embodiment 1 in terms of the structure of the opening and closing member 4 designed to open and close the slit 3. However, advantageous effects are the same as those obtained in Embodiment 1. Thus, accounts of the effects are omitted.

Embodiment 2

Figure 7:
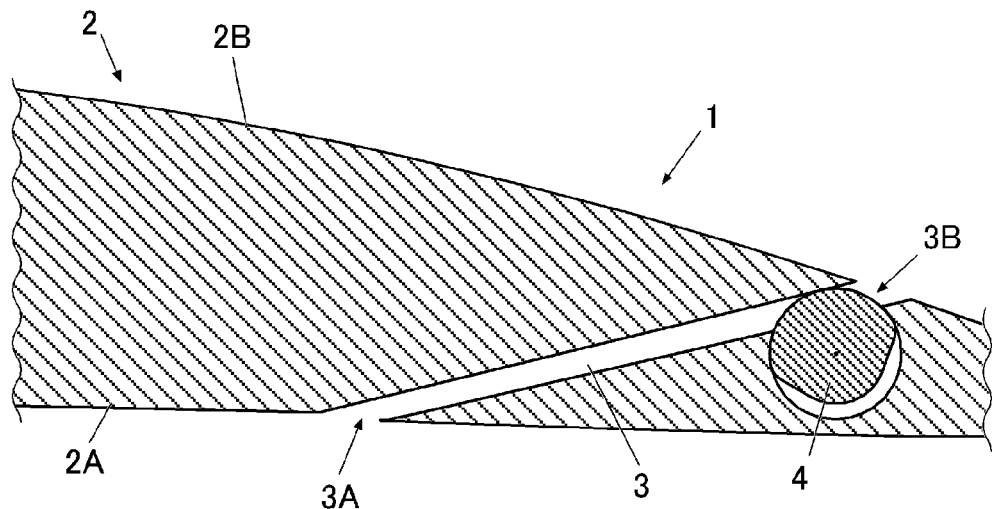
FIG. 7 is a cross-sectional view illustrating a structure of a lift-changing mechanism according to Embodiment 2.

In Embodiment 1, the opening and closing member 4 is provided in front of the slit 3 inside the wing 2. However, as illustrated in FIG. 7, an opening and closing member 4 may be provided behind a slit 3 inside a wing 2 (provided in a remaining portion obtained by hypothetically removing, from the wing 2, a portion including a leading edge 2a (see FIG. 1 and FIG. 5B) of the wing 2).

Even in this structure, the slit 3 can be opened and closed by rotating the bar-shaped opening and closing member 4 while maintaining or changing the rotational direction. Hence, the same advantageous effects as those obtained in Embodiment 1 can be obtained.

Embodiment 3

Figure 8:
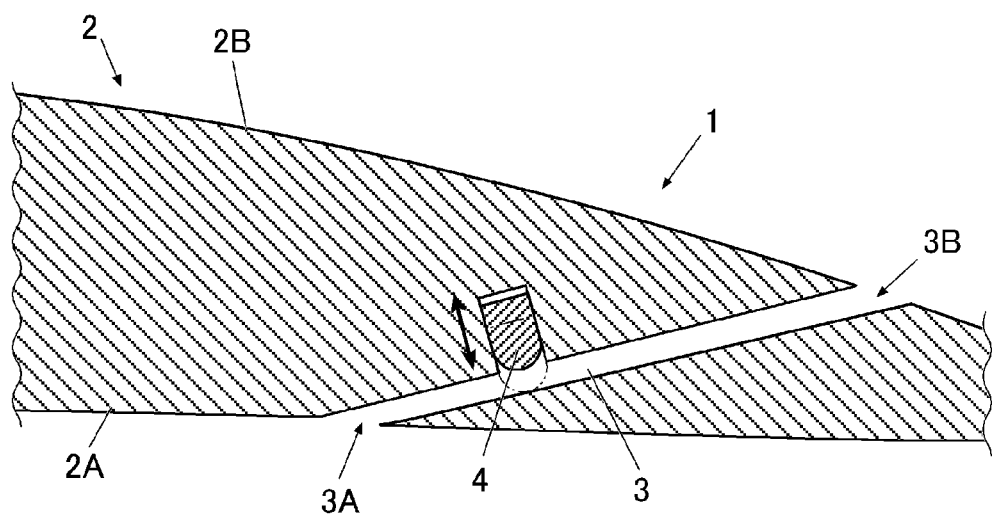
FIG. 8 is a cross-sectional view illustrating a structure of a lift-changing mechanism according to Embodiment 3.

Instead of employing the opening and closing member 4 rotatable in one or both rotational directions, for instance, as illustrated in FIG. 8, it is possible to employ an opening and closing member 4 that can close a slit 3 by moving toward the slit 3 inside a wing 2 and that can open the slit 3 by moving away from the slit 3 inside the wing 2.

In this case, for instance, the bar-shaped opening and closing member 4 may extend in a wingspan direction inside the wing 2 and be disposed parallel to the slit 3. To open and close the slit 3, the opening and closing member 4 reciprocates toward and away from the slit 3.

It should be noted that instead of causing the opening and closing member 4 to reciprocate, for instance, it is possible to cause the opening and closing member 4 to move toward and away from the slit 3 on, for example, an arc.

Even in the structure in Embodiment 3, the slit 3 can be properly opened and closed by the opening and closing member 4. Hence, the same advantageous effects as those obtained in Embodiment 1 can be obtained.

Embodiment 4

Figure 9A:
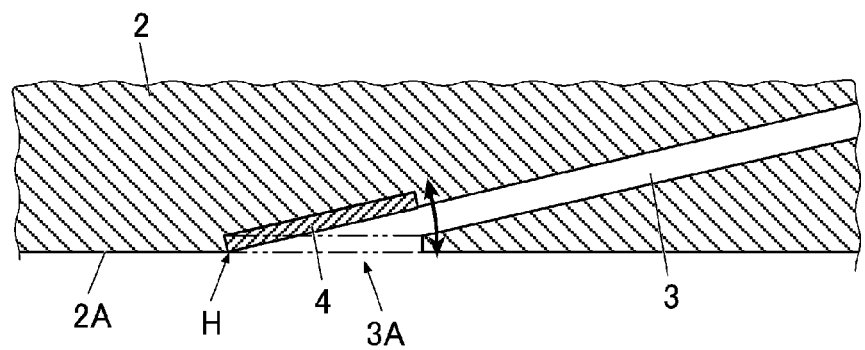
FIGS. 9A and 9B each illustrate a structure of a lift-changing mechanism according to Embodiment 4.
Figure 9B:
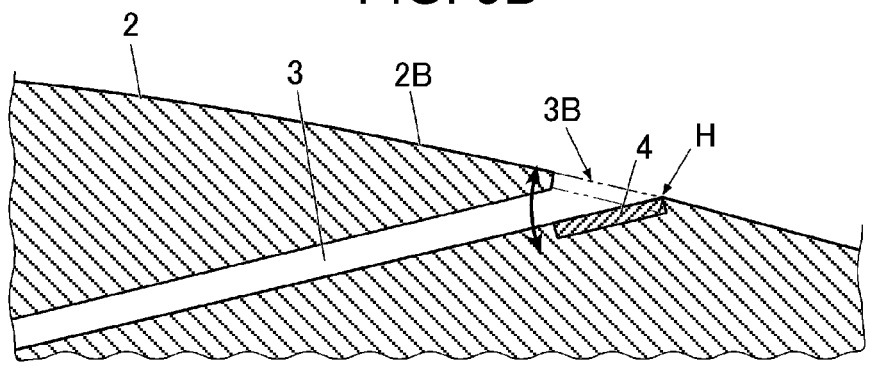

As illustrated in FIGS. 9A and 9B, an opening and closing member 4 may be a lid-shaped component and be provided in one or both of an opening 3A on a lower surface 2A of a wing 2 and an opening 3B on an upper surface 2B of the wing 2, the openings 3A and 3B being part of a slit 3.

In this case, for instance, the opening and closing member 4 may be flat. The slit 3 can be opened and closed by swinging the opening and closing member(s) 4 on a hinge (hinges) H in the opening 3A and/or the opening 3B of the slit 3.

To open and close the slit 3, instead of swinging the opening and closing member(s) 4 on the hinge(s) H, for instance, the opening and closing member(s) 4 may slide along the lower surface 2A and/or the upper surface 2B of the wing 2.

Even in the structure in Embodiment 4, the slit 3 can be properly opened and closed by the opening and closing member(s) 4. Hence, the same advantageous effects as those obtained in Embodiment 1 can be obtained.

The lift-changing mechanism may have a structure obtained by combining Embodiments 1 to 4.

Although Embodiments 1 to 4 of the disclosure are described above, the disclosure is not limited to the descriptions in Embodiments 1 to 4, and alterations can be appropriately made without departing from the spirit of the disclosure.

The invention claimed is:

1. A lift-changing mechanism configured to change lift generated by a wing of an aircraft, the lift-changing mechanism comprising:
   a slit that extends in a wingspan direction inside the wing and that forms openings on a lower surface of the wing and on an upper surface of the wing respectively, the slit being a slit through which a part of airflow below the lower surface is allowed to flow toward the upper surface; and
   an opening and closing member configured to open and close the slit,
   wherein the opening and closing member is configured to rotate around an axis and includes a shape of which a radius from the axis to an outer edge of the opening and closing member is not constant,
   wherein the opening and closing member is configured to alternately repeat, by rotating in one rotational direction around the axis, a first state that the opening and closing member opens the slit and a second state that the opening and closing member closes the slit,
   wherein the opening and closing member is provided in a gap, the gap is provided within an interior of the wing between the lower surface of the wing and the upper surface of the wing, and
   wherein a front end of the gap is defined by a wall provided within the interior of the wing, closer to a trailing edge of the wing than to a leading edge of the wing.

2. The lift-changing mechanism according to claim 1, wherein the opening on the lower surface of the wing is closer to a leading edge of the wing than the opening on the upper surface of the wing, the openings being part of the slit.

3. The lift-changing mechanism according to claim 1, wherein the opening and closing member is bar-shaped, passes through the wing so as to extend in the wingspan direction, and is disposed parallel to the slit, and
   wherein the axis extends in a longitudinal direction of the opening and closing member.

4. The lift-changing mechanism according to claim 2, wherein the opening and closing member is bar-shaped, passes through the wing so as to extend in the wingspan direction, and is disposed parallel to the slit, and
   wherein the axis extends in a longitudinal direction of the opening and closing member.

5. The lift-changing mechanism according to claim 3, wherein the opening and closing member is provided at one of:

a wing tip of the wing; or abutting a fuselage of the aircraft.

6. The lift-changing mechanism according to claim 3, wherein the gap is coupled to the slit via a portion opened on a first inner wall of the slit, wherein, in the second state, a portion of the opening and closing member with the largest radius projects into the slit from the gap via the portion and closes to a second inner wall opposite the first inner wall of the slit to a first distance, and wherein, in the first state, the portion of the opening and closing member with the largest radius is away from the second inner wall more than the first distance.

7. The lift-changing mechanism according to claim 3, wherein the gap is coupled to the slit via a portion opened on a first inner wall of the slit, wherein, in the second state, a portion of the opening and closing member with the largest radius projects into the slit from the gap via the portion and contacts a second inner wall opposite the first inner wall of the slit, and wherein, in the first state, the portion of the opening and closing member with the largest radius separates from the second inner wall.

8. The lift-changing mechanism according to claim 1, wherein the gap is coupled to the slit via a portion opened on a first inner wall of the slit, wherein, in the second state, a portion of the opening and closing member with the largest radius projects into the slit from the gap via the portion and closes to a second inner wall opposite the first inner wall of the slit to a first distance, and wherein, in the first state, the portion of the opening and closing member with the largest radius is away from the second inner wall more than the first distance.

9. The lift-changing mechanism according to claim 1, wherein the gap is coupled to the slit via a portion opened on a first inner wall of the slit, wherein, in the second state, a portion of the opening and closing member with the largest radius projects into the slit from the gap via the portion and contacts a second inner wall opposite the first inner wall of the slit, and wherein, in the first state, the portion of the opening and closing member with the largest radius separates from the second inner wall.

10. A lift-changing mechanism configured to change lift generated by a wing of an aircraft, the lift-changing mechanism comprising:

a slit that extends in a wingspan direction inside the wing and that forms openings on a lower surface of the wing and on an upper surface of the wing respectively, the slit being a slit through which a part of airflow below the lower surface is allowed to flow toward the upper surface; and an opening and closing member configured to open and close the slit, wherein the opening and closing member is configured to rotate around an axis and includes a shape of which a radius from the axis to an outer edge of the opening and closing member is not constant, wherein the opening and closing member is configured to alternately repeat, by rotating in one rotational direction around the axis, a first state that the opening and closing member opens the slit and a second state that the opening and closing member closes the slit, and wherein the opening and closing member is provided at one of:

a wing tip of the wing; or abutting a fuselage of the aircraft.

* * * * *